Figure 1:
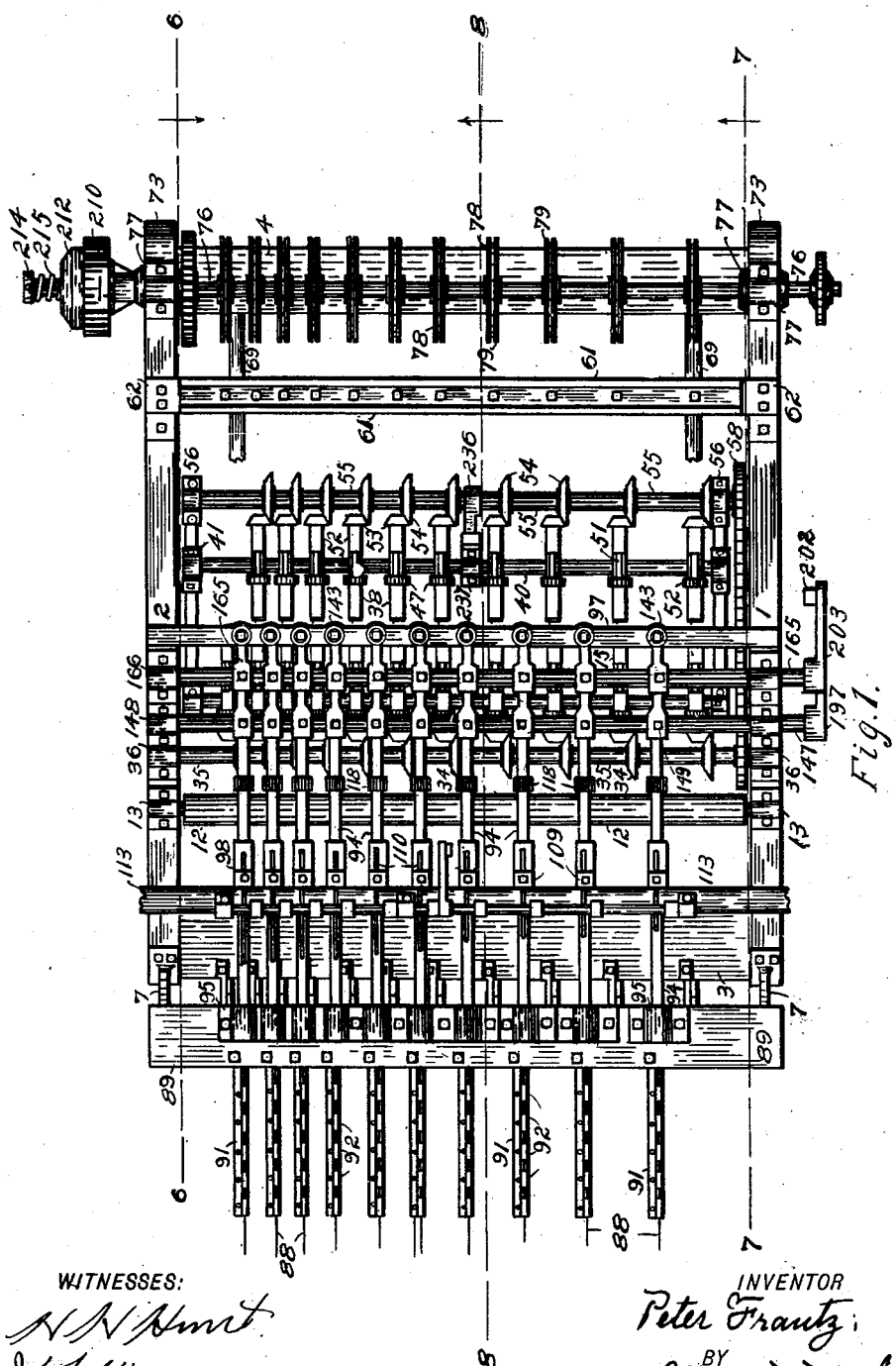

No. 739,846. PATENTED SEPT. 29, 1903.
P. FRANTZ.
WIRE FENCE MACHINE.
APPLICATION FILED FEB. 21, 1903.

NO MODEL. 13 SHEETS—SHEET 1.

WITNESSES:
N. N. Hunt
I. L. Weaver

INVENTOR
Peter Frantz
BY
Walter N. Haskell
ATTORNEY

No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 3.

WITNESSES:
N. H. Hunt.
L. L. Weaver

INVENTOR
Peter Frantz,
BY
Walter N. Haskell.
ATTORNEY

No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 4.
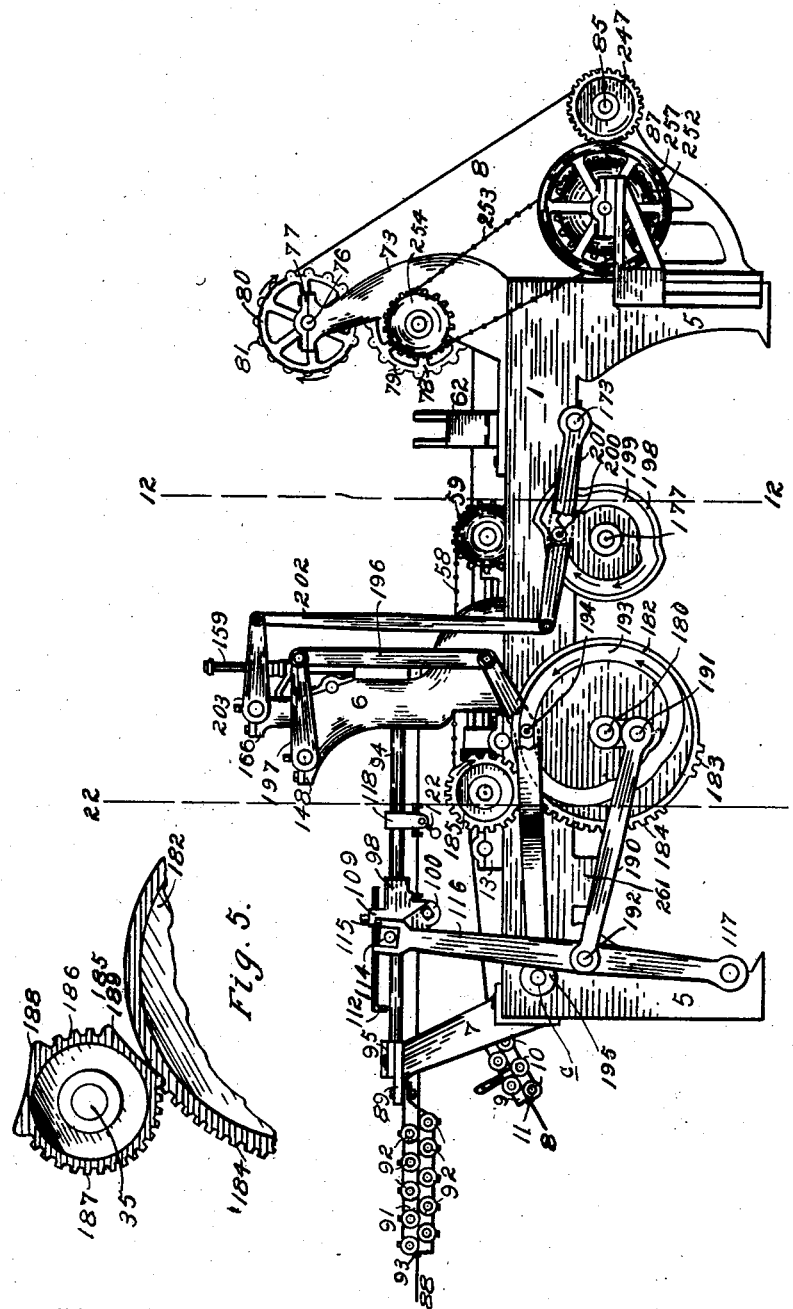
WITNESSES:
N. N. Hunt
L. L. Weaver
INVENTOR
Peter Frantz,
BY Walter N. Haskell.
ATTORNEY

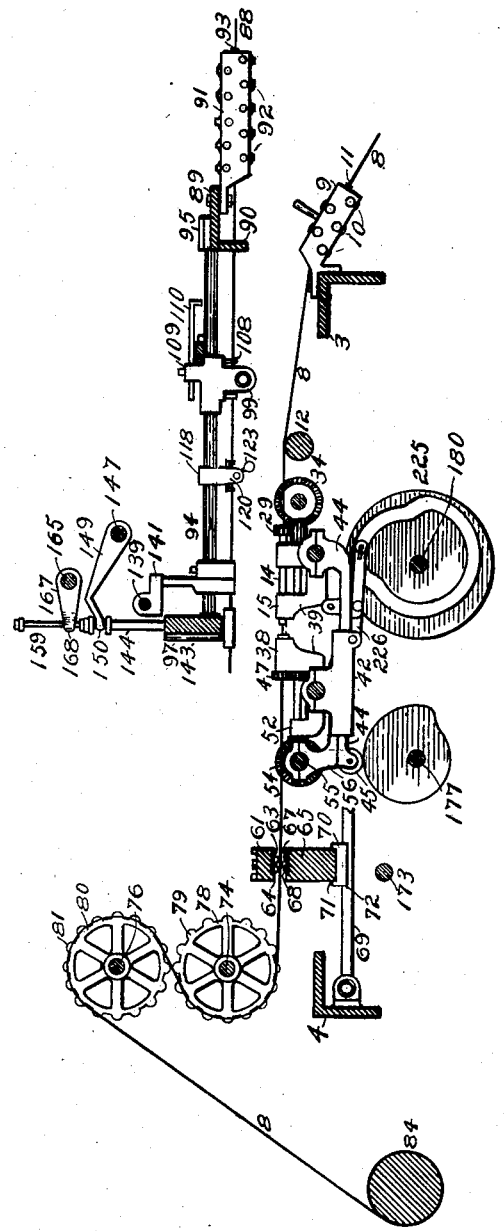

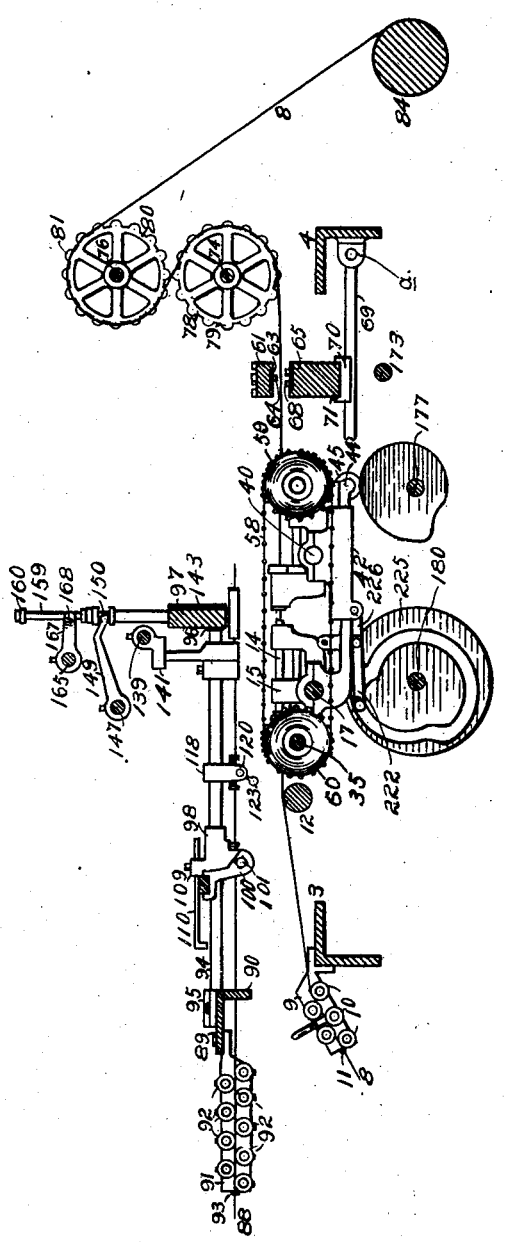

No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 7.
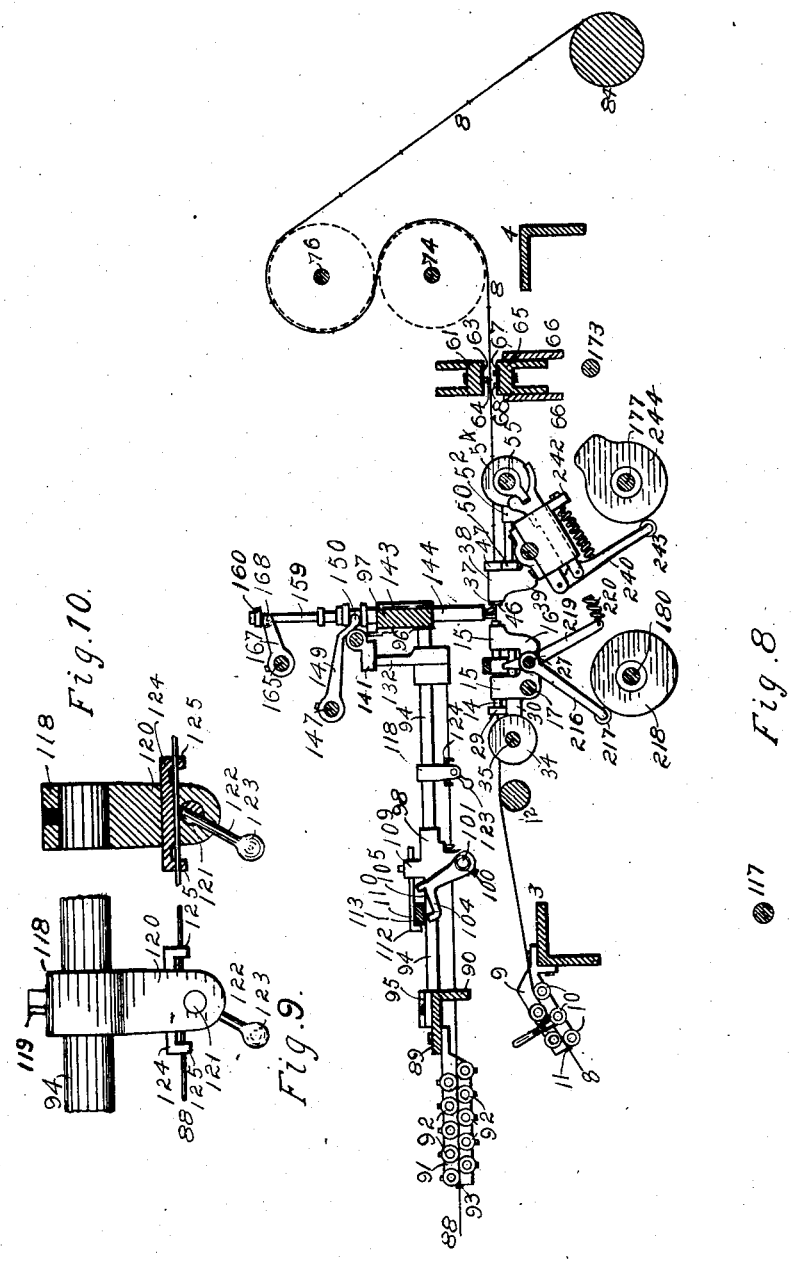
WITNESSES:
N. H. Hunt.
D. L. Weaver
INVENTOR
Peter Frantz,
BY
Walter N. Haskell
ATTORNEY No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 8.

WITNESSES:
N. N. Hunt
L. L. Weaver

INVENTOR
Peter Frantz,
BY Walter N. Haskell.
ATTORNEY

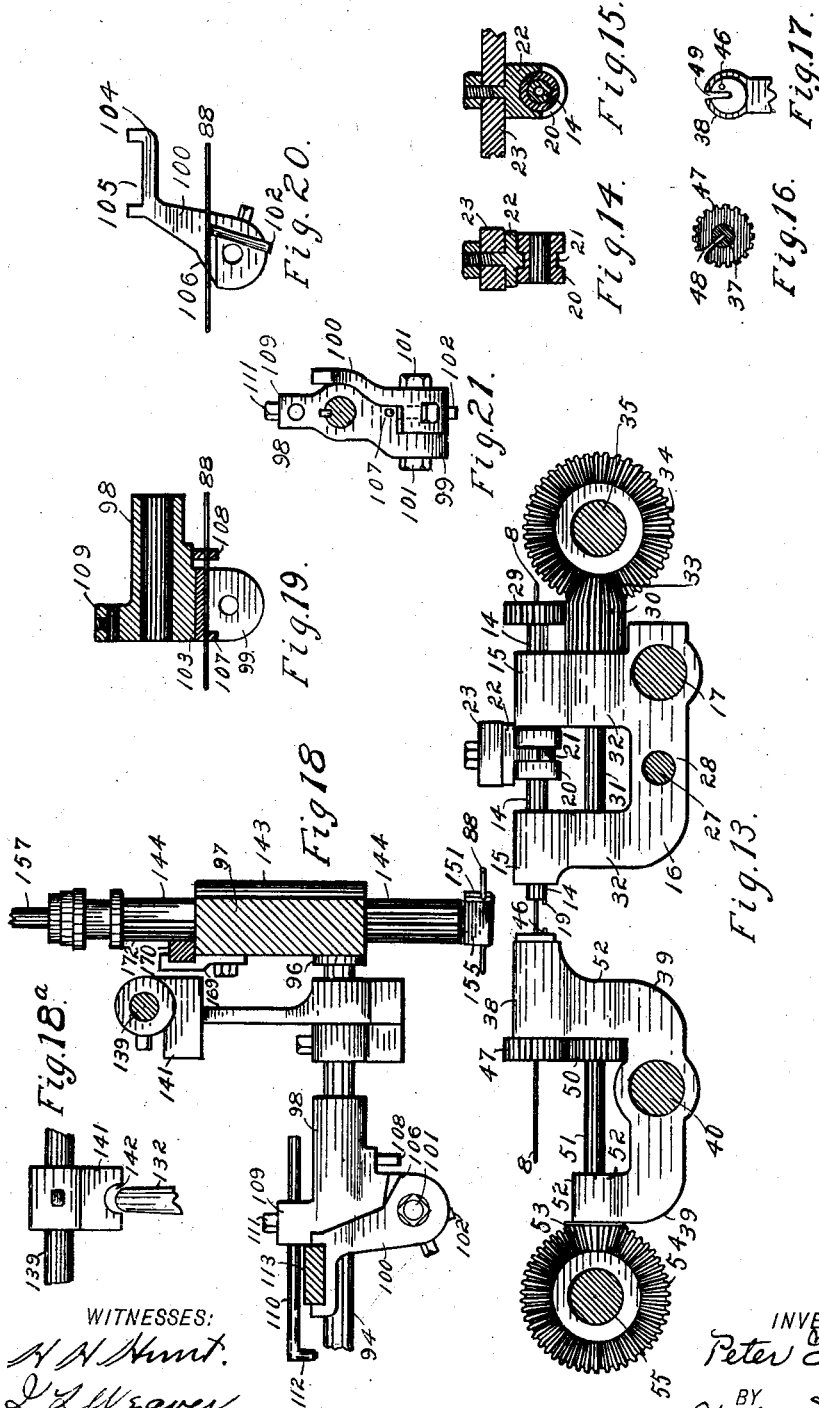

No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 10.
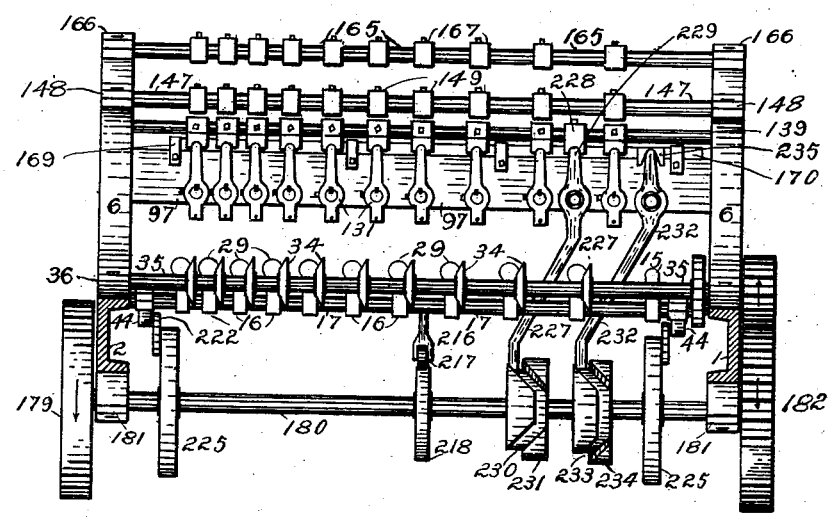
Fig.22.
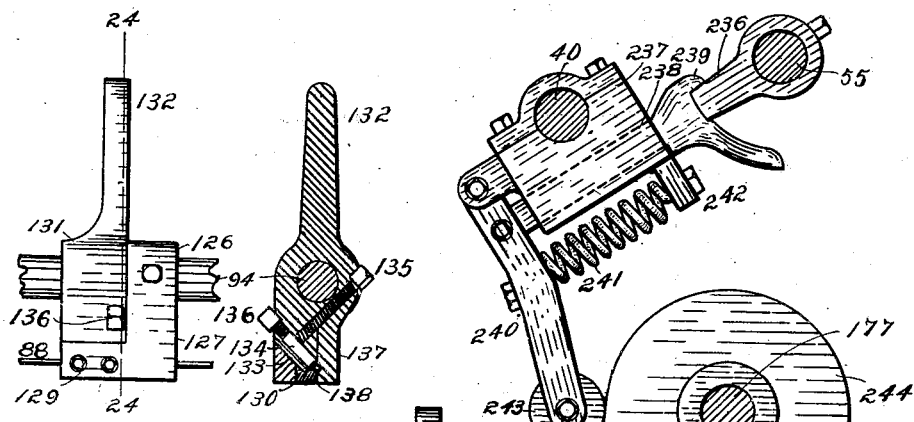
Fig.23.  Fig.24.
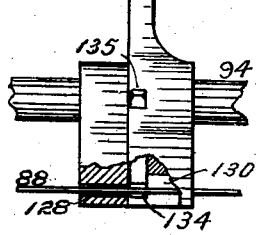
Fig.25.
Fig.26.
WITNESSES:
N. N. Hunt.
D. L. Weaver
INVENTOR
Peter Frantz,
BY Walter N. Haskell.
ATTORNEY

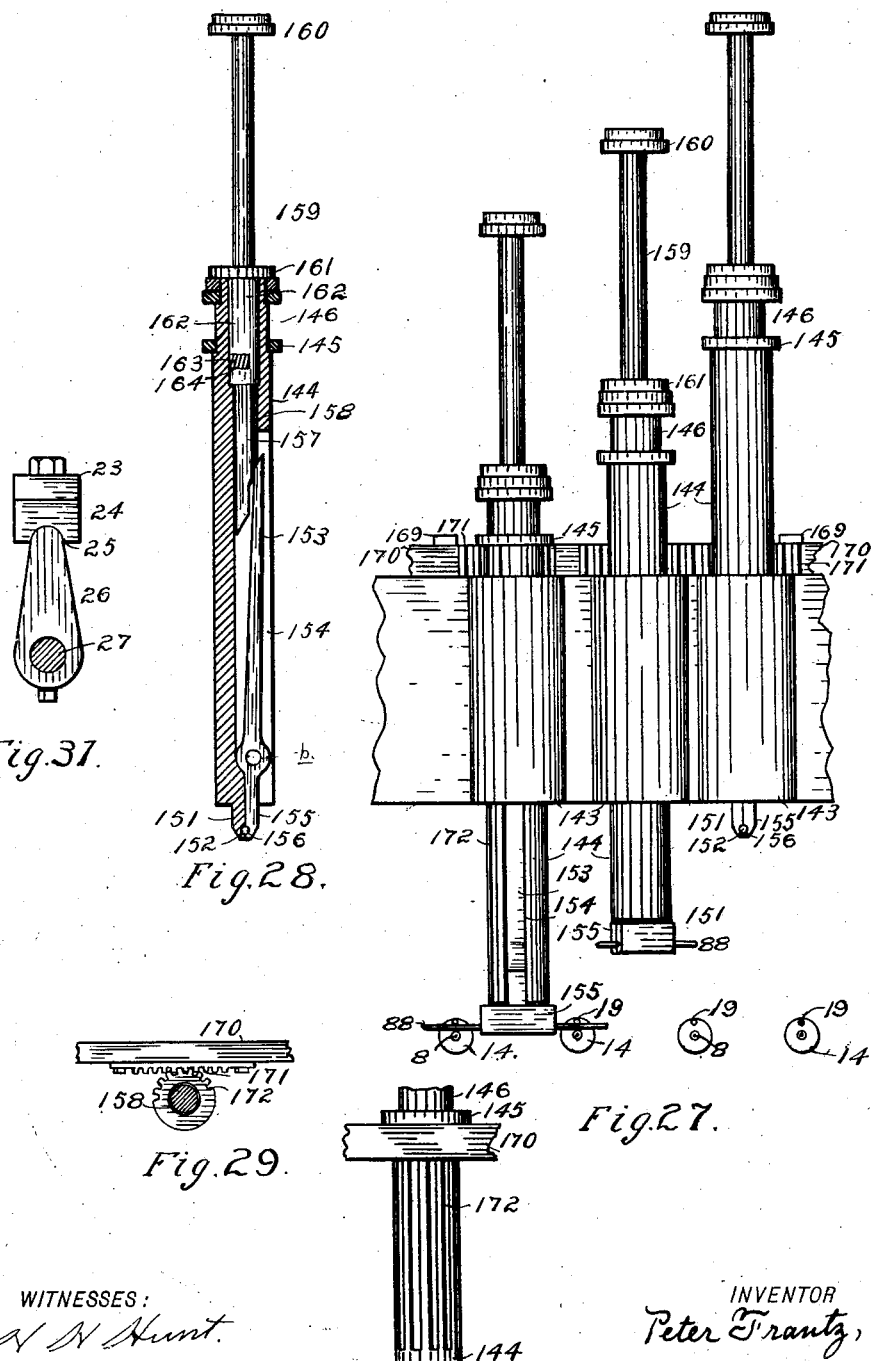

No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 12.
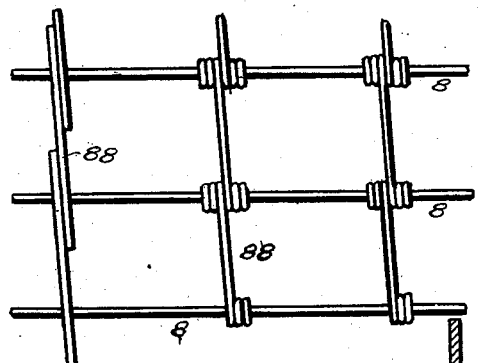
Fig. 39.
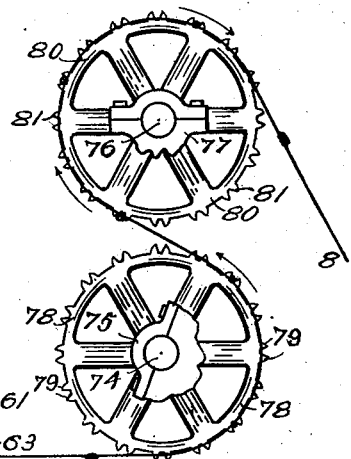
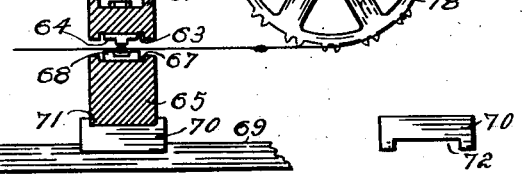
Fig. 32.   Fig. 33.
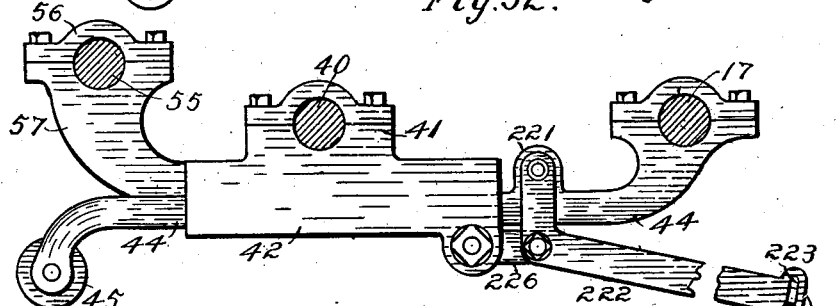
Fig. 37.
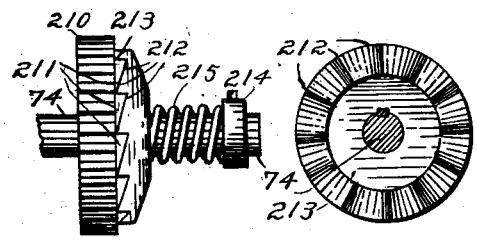
Fig. 35.   Fig. 36.
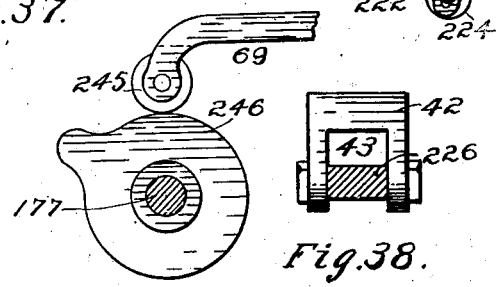
Fig. 34.   Fig. 38.
WITNESSES:
N. N. Hunt.
I. L. Weaver.
INVENTOR
Peter Frantz,
BY
Walter N. Haskell.
ATTORNEY No. 739,846. PATENTED SEPT. 29, 1903.
P. FRANTZ.
WIRE FENCE MACHINE.
APPLICATION FILED FEB. 21, 1903.
NO MODEL. 13 SHEETS—SHEET 13.
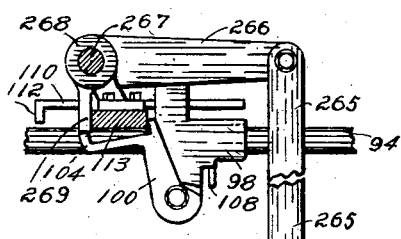
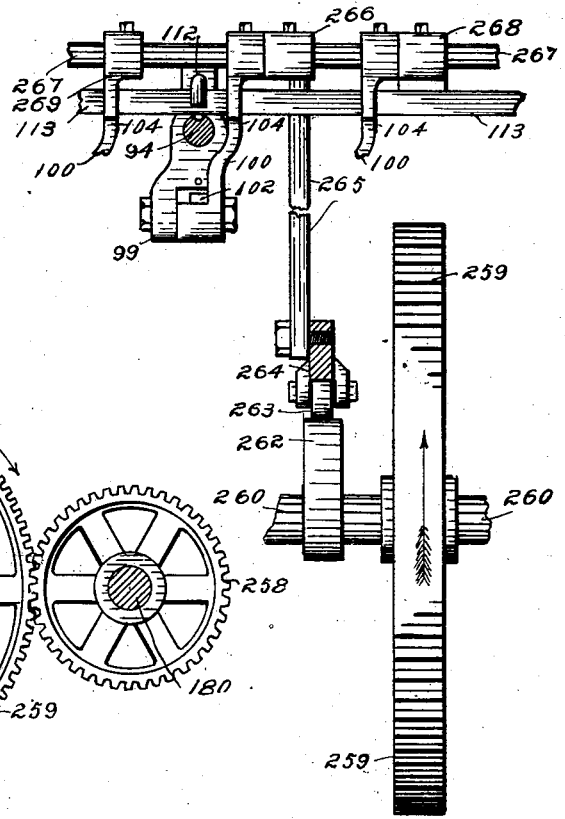
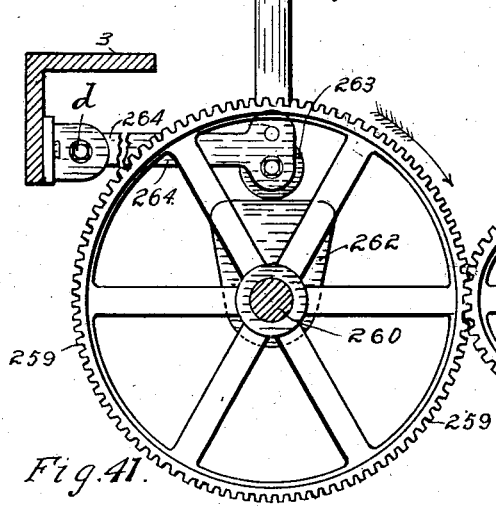
Fig.41.
Fig.40.
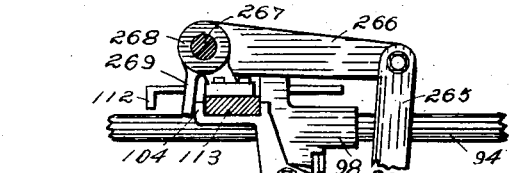
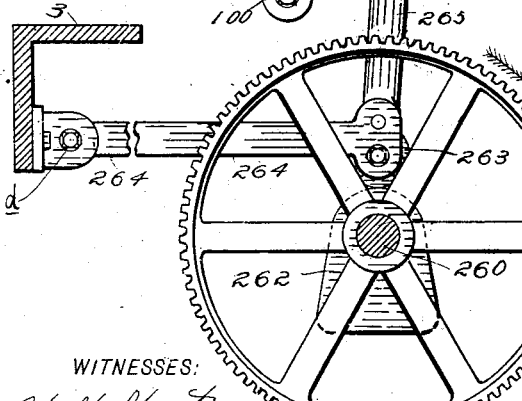
Fig.42.
WITNESSES:
H N Hunt
L L Weaver
INVENTOR
Peter Frantz,
BY
Walter N. Haskell.
ATTORNEY
THE NORRIS PETERS CO., PHOTO-LITHO., WASHINGTON, D. C.

No. 739,846. Patented September 29, 1903.

UNITED STATES PATENT OFFICE.

PETER FRANTZ, OF STERLING, ILLINOIS, ASSIGNOR TO W. M. DILLON, OF STERLING, ILLINOIS.

WIRE-FENCE MACHINE.

SPECIFICATION forming part of Letters Patent No. 739,846, dated September 29, 1903.

Application filed February 21, 1903. Serial No. 144,553. (No model.)

*To all whom it may concern:*

Be it known that I, PETER FRANTZ, a citizen of the United States, residing at Sterling, in the county of Whiteside and State of Illinois, have invented certain new and useful Improvements in Wire-Fence Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention has reference to wire-fence machines, and more particularly to that class thereof which are designed for the manufacture of what is known as a "square-mesh" fence. The special style of such fence which my machine is adapted to produce consists of a series of horizontal strand-wires united at regular intervals by series of vertical stay-wires, each transverse series consisting of a plurality of short stay-wires in approximate alinement across the fence and having their ends coiled alternately in opposite directions upon two adjacent strand-wires.

The chief functions of the machine consist in feeding a series of strand-wires into and through the machine, feeding a series of wires into the machine in the same direction with the strand-wires to be formed into stay-wires, cutting such stay-wires therefrom, delivering such stay-wires to the strand-wires in position to be secured thereon, and coiling the ends of such stay-wires upon the strand-wires.

Figure 2:
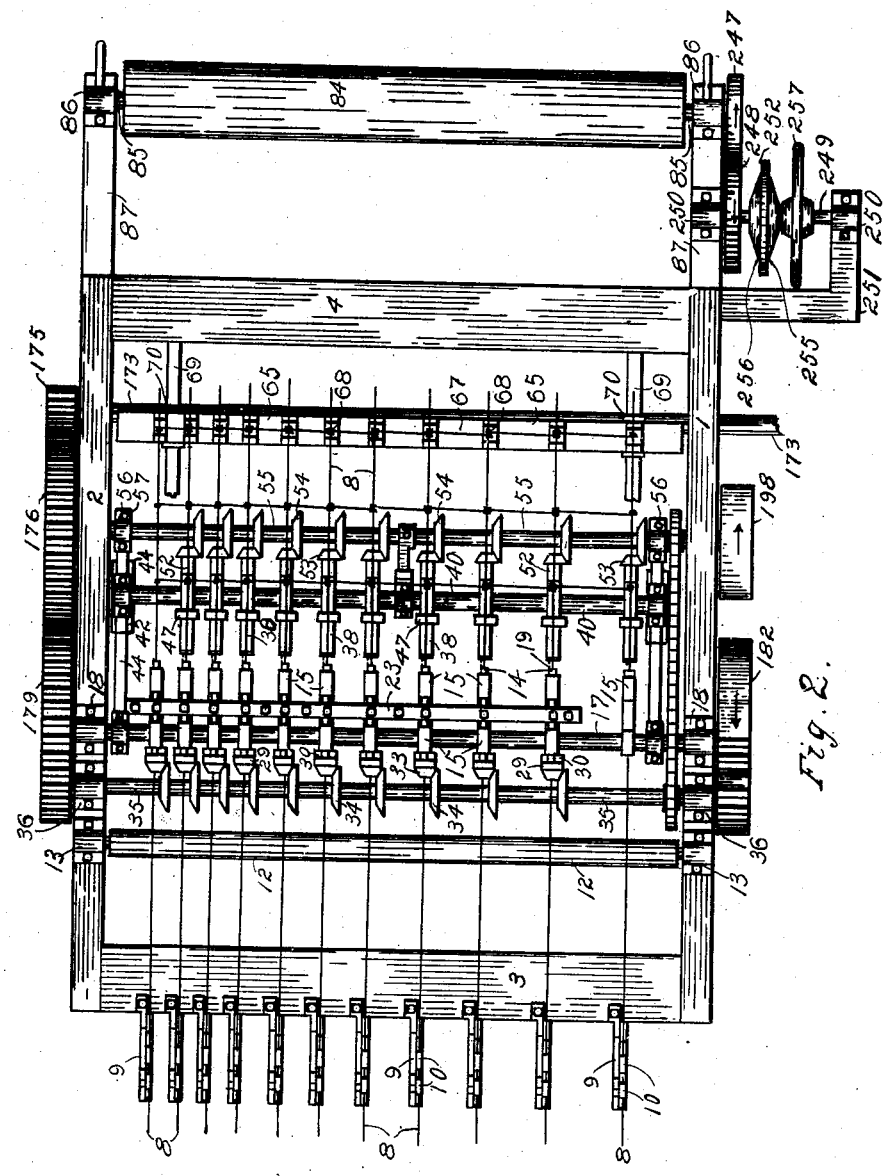
Figure 3:
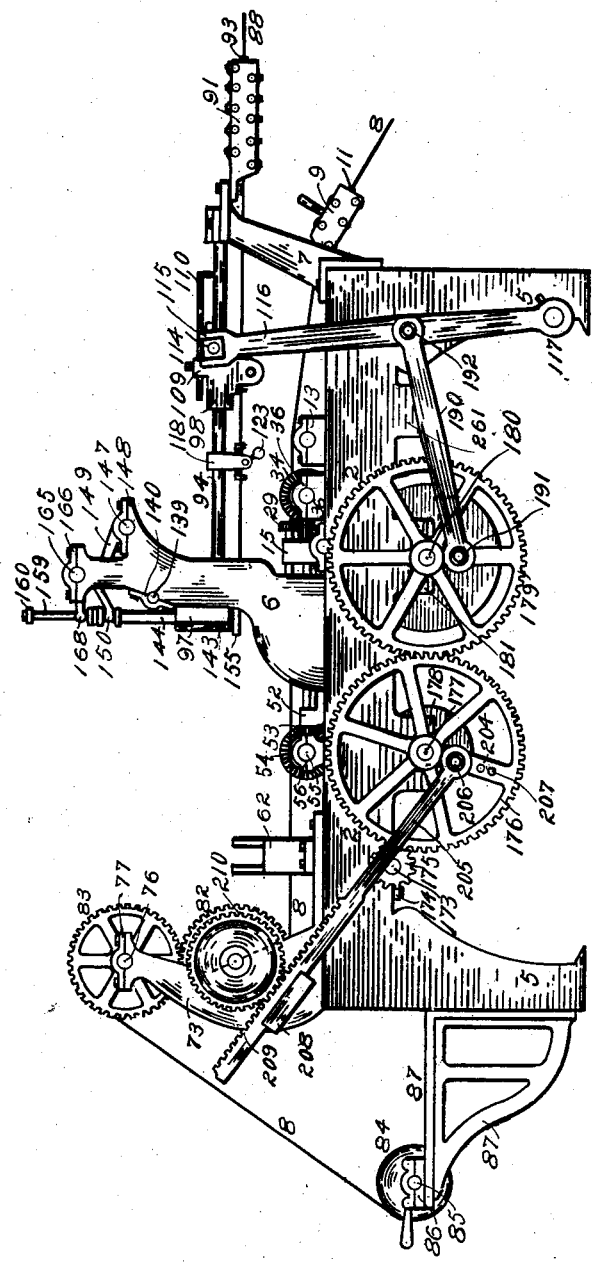
Figure 11:
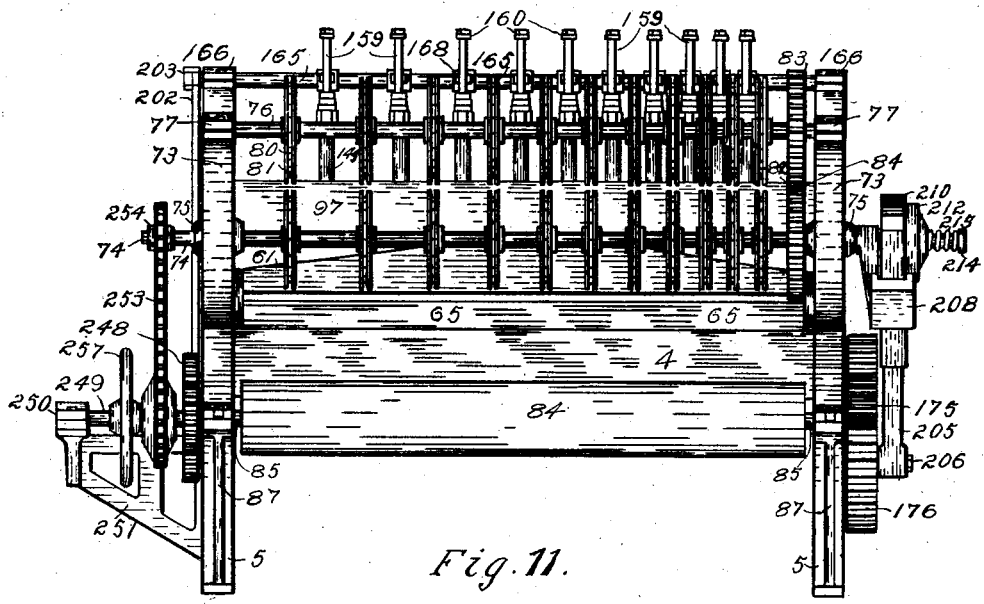
Figure 12:
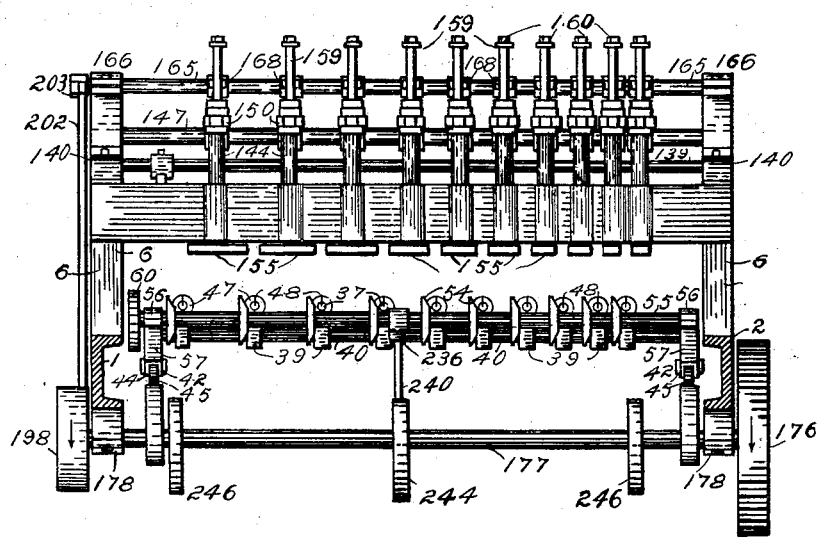

In the drawings, Figure 1 is a plan view of my machine with some of the parts outside of the frame removed. Fig. 2 is a plan view thereof with the main supports and superstructure removed. Fig. 3 is a side elevation showing the left side of the machine. Fig. 4 is a similar view showing the right side thereof. Fig. 5 is an enlarged partial detail of some of the mechanism shown in Fig. 4. Fig. 6 is a vertical longitudinal section in the line 6 6 of Fig. 1. Fig. 7 is a similar view in the line 7 7 of Fig. 1. Fig. 8 is a similar view in the line 8 8 of Fig. 1. Fig. 9 is an enlarged detail of the hanger 118 and grip mechanism supported thereby. Fig. 10 is a vertical longitudinal section thereof. Fig. 11 is a front elevation of the machine. Fig. 12 is a vertical cross-section in the line 12 12 of Fig. 4 looking toward the rear of the machine. Fig. 13 is a side elevation from the left side of the machine exhibiting in enlarged detail the coiling mechanism. Fig. 14 is a vertical longitudinal section of the collar 20 and operating-yoke. Fig. 15 is a vertical cross-section thereof. Fig. 16 is a cross-section of the spindle 37 and gear-wheel 47, fixed thereon. Fig. 17 is an end view of the spindle 37 and bearing 38 therefor. Fig. 18 is a side elevation looking toward the left side of the machine, showing parts of the feed and cutting mechanism for the stay-wires in detail. Fig. 18ᵃ is a rear elevation in detail, showing means for actuating the cutting-knife. Fig. 19 is a vertical longitudinal section of the carrier 98. Fig. 20 is a detail of the grip-jaw 100, showing the inner face thereof. Fig. 21 is a rear end elevation of the carrier 98 and dependent mechanism. Fig. 22 is a vertical cross-section in the line 22 22 of Fig. 4, looking toward the front of the machine. Fig. 23 is a side elevation in detail of the cutting mechanism. Fig. 24 is a vertical cross-section thereof in the line 24 24 of Fig. 23. Fig. 25 is an elevation of the cutting mechanism looking toward the left side of the machine with parts thereof in section. Fig. 26 is an enlarged detail showing the mechanism for locking the shaft 55 from rotation. Fig. 27 is a detail view, in front elevation, of a part of the mechanism for handling the stay-wires, such mechanism being displayed in three different positions therein. Fig. 28 is a vertical section of one of the vertical spindles 144. Fig. 29 is a plan view showing in detail the rack-and-gear mechanism for operating the spindle 144. Fig. 30 is an enlarged detail showing the gearing on the upper end of the spindle 144. Fig. 31 is a detail showing the method of oscillating the cross-bar 23. Fig. 32 shows a pair of the feed-reels in side elevation and the crimping device in cross-section. Fig. 33 is an end view of one of the blocks 70. Fig. 34 shows the means for operating the crimping mechanism. Fig. 35 shows in detail the end of the shaft 74 and operating mechanism located thereon. Fig. 36 is a detail showing the inner face of the ratchet-disk 213. Fig. 37 is a side elevation of the support 44 and mechanism pertaining thereto. Fig. 38 is an end view of the slide-block 42. Fig. 39 is a section of wire fence such as is produced by my machine with a portion of one of the series of stay-wires in position to be coiled upon the strand-wires. Fig. 40 is a rear elevation showing a supplemental device for preventing the operation of the grip-jaw 100 during each alternate movement of the strand-wires. Fig. 41 is a side elevation of the last-named mechanism, showing the same in operation. Fig. 42 is a similar view showing such mechanism in a different position.

Similar characters refer to similar parts throughout the several figures.

In describing the machine that end thereof into which the wires are introduced will be treated as the "rear" end of the machine, that end from which the completed fabric is delivered will be referred to as the "front" end thereof, and the sides of the machine will be spoken of as the "right" and "left" sides thereof, accordingly as the same are on the right or left of the line of movement of the wires through the machine looking in the direction of the line of movement thereof.

To avoid confusion, those groups of mechanism which act more or less directly upon the wires in some one of the processes of feeding, cutting, delivering, and coiling the same will first be considered and described, after which the power mechanism, whereby the first-named groups are actuated and controlled, will be taken up and explained.

The mechanism is all supported upon a frame consisting of side plates 1 and 2, united at the rear and front ends, respectively, by heavy angle-plates 3 and 4. The rectangular frame thus formed is supported at each corner by a leg 5, rigidly secured thereto. Fixed upon the plates 1 and 2 centrally of the frame is a pair of supports 6 6, while at the rear end of the frame is secured a pair of rearwardly-extending supports 7 7.

Referring now more specially to Figs. 2 and 7 of the drawings, the numerals 8 8 represent a series of parallel strand-wires in a state of progress through the machine. As the several parts or groups of mechanism which operate upon or have any reference to the passage of one of such strand-wires through the machine are substantially identical with the mechanism relating to any other wire in the series, or are common to all of such wires, only one of such strand-wires and its attendant mechanism will for the present be described. To the rear angle-plate 3 of the machine is secured a straightening-head 9, supporting a number of usual rolls 10, and a guide 11, through which guide and rolls the wire 8 is first introduced into the machine, after which it passes over a transverse roller 12, journaled in bearings 13 on the plates 1 and 2. The wire 8 then passes through a hollow spindle 14, adapted to rotate in bearings 15, formed on a support 16. The support 16 is fixed on a stationary shaft 17, rigidly secured in bearings 18 in the side plates 1 and 2. The spindle 14 is provided at its forward end with a coiling-pin 19. Firmly secured on the spindle 14 is a collar 20, having an annular channel 21, engaged by a yoke 22, secured on the lower side of a transverse bar 23, Figs. 13 to 15. The ends of the bar 23 are provided with blocks 24, having in their lower faces channels 25, Fig. 31, which are engaged by the free ends of vertical arms 26, fixed on a rock-shaft 27. The shaft 27 is supported in perforations 28 in the supports 16. By this means when movement is imparted to the rock-shaft 27 in the manner hereinafter set forth there is communicated to the spindle 14 a limited longitudinal movement in the bearings 15. On the rear end of the spindle 14 is a small gear-wheel 29, engaged and operated by a similar gear-wheel 30, secured on the end of a small shaft 31, journaled in bearings 32 in the support 16. The gears on the wheel 30 are longer than those of the wheel 29 in order that such wheels may continue in engagement throughout the longitudinal movement of the spindle 14. Integral with the gear-wheel 29 is a bevel gear-pinion 33, engaged and driven by a bevel gear-wheel 34 on a rotary shaft 35, journaled at its ends in bearings 36 in the side plates 1 and 2. By the last-described mechanism when movement is imparted to the rotary shaft 35, as hereinafter shown, a rotary motion is communicated to the spindle 14. From the spindle 14 the wire 8 passes through a spindle 37, having rotation in the bearing 38 on the support 39. The support 39 is firmly seated upon a transverse shaft 40, rigidly secured in a bearing 41 on a carrier 42. On the lower side of the carrier 42 is a channel 43, by means of which such carrier is held upon a support 44, Figs. 37 and 38, so as to be permitted longitudinal movement thereon. The support 44 is pivotally secured at one end to the shaft 17, so as to permit vertical movement of the free end of such support. On the forward end thereof is a friction-roller 45. The ends of the shaft 40 are similarly supported by two of the carriers 42 on corresponding supports 44.

By the above-described arrangement there may be imparted to the spindles 37 by the process hereinafter set forth a limited amount of movement longitudinally of the machine.

In that end of the spindle 37 adjacent to the spindle 14 is a coiling-pin 46, while on the other end of the spindle 37 is fixed a gear-wheel 47. Extending into the gear-wheel 47 and spindle 37 a little beyond the center thereof is a channel 48, and the bearing 38 is provided with a longitudinal slot 49, such slot being normally in line with the channel 48, so as to register therewith, Figs. 16 and 17. The gear-wheel 47 is engaged and actuated by a similar gear-wheel 50, fixed on a shaft 51, which is journaled in bearings 52 on the support 39. On the front end of the shaft 51 is fixed a bevel gear-pinion 53, which is engaged by a bevel gear-wheel 54, seated on a rotary shaft 55. The shaft 55 is journaled near its ends in bearings 56, supported in projections 57 on the carriers 42, Fig. 6. Upon the rotation of the shaft 55 a rotary motion is imparted to the spindle 37 through the intermediate mechanism just described. A rotary motion is communicated to the shaft 55 from the shaft 35 by means of a sprocket-chain 58, connecting a sprocket-wheel 59 on the end of the shaft 55 with a similar sprocket-wheel 60 on the end of the shaft 35, Fig. 7.

Between the spindles 14 and 37 the ends of two adjoining stay-wires are coiled upon the wire 8 in the manner hereinafter described. While this operation is being performed the spindles 14 and 37 are horizontally in line with each other; but as soon as the coiling of the stay-wires is completed the supports 44 move downwardly sufficiently to disengage the spindle 37 from the wire 8 and permit the passage of the stay-wires above such spindle and the other mechanism supported by the carriers 42.

The seating of the stay-wires of a series is identical in point of time, so that the strand-wires are all ready to be moved forward at the same time, such wires now comprising, with the stay-wires affixed thereto, the completed fabric.

Soon after leaving the coiling mechanism the wires 8 pass through a crimping device adapted to form a bend or crimp in each of the strand-wires at the point of junction of the stay-wires therewith. This is accomplished by the following means, as shown in Figs. 4, 7, and 8: A transverse bar 61 is rigidly secured to supports 62 on the side plates 1 and 2, such bar having in its lower face a channel 63, in which is secured a plurality of dies 64, one for each of the wires 8. Below the bar 61 is a cross-bar 65, capable of vertical movement in ways 66 in the supports 62. In its upper face the bar 65 is provided with a channel 67, adapted to hold a number of dies 68, corresponding in number and position to the dies 64, each wire 8 being bent by one of such pairs of dies. Below the cross-bar 65 is a pair of supports 69, pivoted to the plate 4, as at a, and interposed between each support 69 and the bar 65 is a slide-block 70. Each of the blocks 70 has a transverse channel 71, engaged by the bar 65, and a longitudinal channel 72 in its lower face, engaged by the support 69, Figs. 32 and 33.

The wires 8 are drawn through the machine by the following means: At the front end of the machine is a pair of supports 73, in which a rotary shaft 74 is journaled in bearings 75 and a rotary shaft 76 is journaled in bearings 77, Figs. 4 and 11. The shaft 74 carries a series of reels 78, one for each of the strand-wires, each reel being provided upon its periphery with a plurality of equidistant bifurcated prongs 79, Fig. 32. The prongs 79 are in alinement transversely of the reels, each row thereof being adapted to engage a series of the stay-wires and aid in drawing the strand-wires through the machine. The shaft 76 is similarly provided with a series of reels 80, corresponding in number and location with the reels 78 and similarly provided with prongs 81, which likewise assist in operating the wires.

When the wires 8 are first introduced into the machine, they are passed beneath the reels 78, partially around the same, and over the reels 80, the direction of rotation of the shafts 74 and 76 being such as to continue the forward movement of such wires. Rotary movement in a contrary direction is imparted to the shaft 76 from the shaft 74 by means of a gear-wheel 82 on the end of the shaft 74 engaging a similar gear-wheel 83 on the end of the shaft 76. The means for actuating the shaft 74 will be hereinafter set forth. From the feed mechanism the fabric passes to and is wound upon a drum 84, secured on the shaft 85, journaled in boxes 86, supported by brackets 87, secured to the front legs 5 of the machine.

There will now be described the progress of the wires from which the stays are formed from their introduction into the machine until the completed stays are seated on the strand-wires. A series of wires is represented by numerals 88, as shown in Figs. 1, 4, and 8. The stays themselves after being severed from the wires 88 are still referred to by the same number. As was the case with the strand-wires, the various groups of mechanism which operate the wires 88 are substantially the same throughout the series, and for the present one of such wires and the parts which relate particularly to the progress thereof or refer thereto in common with all of the other wires 88 will be described. A cross-plate 89 is secured between the supports 7 and reinforced by a longitudinal rib 90. Supported on the cross-plate 89 is a straightening-head 91, carrying a group of rolls 92, and a perforated guide 93, through which guide and rolls the wire 88 is introduced into the machine. A cylindrical-shaped bar 94 is rigidly secured at its rear end in a bearing 95 in the plate 89 and at its forward end in a socket 96 (see Fig. 18) in the rear face of a cross-beam 97, secured at each of its ends in the supports 6. Supported upon the bar 94, so as to have longitudinal play thereon and secured from turning by being feathered thereon, is a carrier 98, from which depends a support 99. A grip-jaw 100 is fixed on a short shaft 101, journaled in the support 99. Supported by the grip-jaw 100 is a grip-pin 102, the upper end of which is adapted to secure the wire 88 against a grip-block 103 in the support 99, Figs. 19 to 21. The grip-jaw 100 is projected upwardly into a rack 104, provided with a recess 105. The downward movement of the rack 104 is limited by a shoulder 106 on the grip-jaw 100, adapted to come in contact with the support 99. Perforated guides 107 and 108 are provided at the ends of the grip-block 103, whereby the passage of the wire directly below such block is insured. Projected upwardly from the carrier 98 is a support 109 in a perforation in which is secured a short rod 110 by means of a set-screw 111. The rear end of the rod 110 has a downwardly-projecting lug 112. Just above the bar 94 is a cross-bar 113, journaled at each end in blocks 114, which have a limited play in recesses 115 in the free ends of levers 116, Figs. 3 and 4. The levers 116 are secured on a rock-shaft 117, journaled in the rear legs 5. By the rocking of the shaft 117 the cross-bar 113 is caused to oscillate longitudinally of the bars 94. At its forward stroke it comes in contact with the carrier 98 and moves the same forward upon the bar 94. In its return movement it comes in contact with the lug 112 and moves the carrier 98 in a rearward direction. In its forward movement the bar 113 also engages the rack 104, forcing the pin 102 against the wire 88 and gripping such wire firmly against the block 103, causing such wire to move forward with the carrier. In commencing its rearward movement the bar 113 forces the rack 104 downwardly, immediately releasing the wire 88 and preventing its being moved backward by the gripping device. A little in front of the carrier 98 a hanger 118 is secured to the bar 94 by means of a set-screw 119. Depending from the hanger 118 is a bifurcated support 120, in the lower end of which is journaled a short shaft 121, Figs. 9 and 10. In this shaft between the leaves of the support 120 is secured a grip-pin 122, provided at its lower end with a weight 123. In the support 120 just above the pin 122 is a grip-bar 124, provided at each end with a perforated guide 125, through which the wire 88 is forced by the feed mechanism recently described. The angle of the pin 122 to the bar 124 is such that the forward movement of the wire 88 is not affected thereby; but a rearward movement of such wire is impossible by reason of the gripping thereof between such grip-pin and grip-bar. From the gripping device just described the wire 88 passes to the cutting mechanism, which is shown in detail in Figs. 23 to 25. Rigidly secured on the bar 94 is a hanger 126, from which depends a support 127, in which is seated a bushing 128, through which the wire 88 passes. The ends of the bushing are flush with the faces of the support 127. At one side the support 127 is projected forwardly into a plate 129, to the inner face of which is secured a block 130. Adjacent to the hanger 126 on the shaft 94 is pivoted a hanger 131, provided with an upwardly-extending arm or rack 132. In the lower part of the hanger 131 is a recess 133, in which is secured a knife 134 by means of a set-screw 136. The lower end of the knife 134 is provided with a cutting edge adapted to pass over the front end of the bushing 128 at the proper time and sever the wire 88 at that point. The knife may be adjusted longitudinally of the recess 133 by a set-screw 136 in the upper end thereof. The hanger 131 is projected downwardly at one side into the support 137, having its inner face in contact with the inner face of the block 130, there being formed in such adjacent faces a circular channel 138 in line with the perforation in the bushing 128, through which channel the wire 88 passes. The cutting of the wire is accomplished by a slight rocking of the hanger 131 sufficient to cause the edge of the knife 134 to traverse the perforation in the bushing 128. The same operation swings the support 137 away from the block 130, releasing the severed wire.

Just above the cutting mechanism is a transverse shaft 139, secured in bearings 140 in the supports 6, so as to have reciprocating movement therein. Secured on the shaft 139 is a block 141, having in its lower face a channel 142, by which the upper end of the arm 132 is engaged. (See Figs. 18, 18ª, and 25.) By this means a slight lateral movement of the bar 139 operates the cutting mechanism above described. After the stay-wire is cut from the wire 88 the method of conveying it to the strand-wires is shown in Figs. 6 and 7 and an enlarged detail in Figs. 27 to 30, inclusive. In the front face of the cross-beam 97 is a vertical sleeve 143, in which a spindle 144 has vertical play. At the upper end of the spindle is a collar 145, having an annular recess 146. To the rear of the cross-beam 97 is a rock-shaft 147, journaled in bearings 148 in the supports 6. Secured to the shaft 147 is an arm 149, having at its forward end a yoke 150, which engages the recess in the collar 145. By the rocking of the shaft 147, as hereinafter explained, the spindle 144 may be raised or lowered, as desired. At the lower end of the spindle 144 is a stationary jaw 151, provided on its inner face with a groove 152. A lever 153 is fulcrumed in a recess 154 in the spindle 144, as at $b$, the upper end of such lever being tapered. At its lower end is a jaw 155, adapted to have contact with the jaw 151 and having on its inner face a transverse groove 156, the grooves 152 and 156 forming a circular channel of a little less diameter than the wire 88. When the wire 88 is being fed into the machine, it passes from the channel 138 into the perforation in the jaws 151 and 155, the spindle 144 being at this time at its highest point and the jaws slightly separated. At the moment of being cut and released by the cutting mechanism the stay-wire is grasped by the jaws 151 and 155 and held by them while conveyed to and coiled upon the strand-wires.

157 is a plunger having vertical play in a recess 158 in the upper part of the spindle 144, the lower end of the plunger being wedge-shaped and adapted to engage the upper end of the lever 153 and force the same outwardly. By this means the jaw 155 is brought in contact with and secured against the jaw 151. The plunger 157 is provided with a shank 159, having collars 160 and 161. To prevent the plunger working loosely in the spindle 144, the shank 159 has an enlarged portion 162, provided with an extensile coiled spring 163, seated in a recess 164 in the enlargement 162, one end of which spring impinges the inner wall of the spindle and by the friction thereby produced prevents a free movement of the plunger. Near the shank 159 is a transverse rock-shaft 165, journaled in bearings 166 in the supports 6, Fig. 1. Secured to the shaft 165 is an arm 167, having at its forward end a yoke 168, which loosely embraces the shank 159. By the rocking of the shaft 165 the plunger 157 is raised or lowered, as desired, through the yoke 168 engaging the collars 160 and 161 on the shank thereof.

By means of clips 169 there is secured on the cross-beam 97 in rear of the shafts 144 a rack-bar 170, provided with sectional racks 171, engaging longitudinal gearing 172 on the upper part of the spindle 144.

After the stay-wire has been severed by the cutting mechanism and embraced by the jaws 151 and 155 the spindle 144 is moved downwardly by the arm 149, conveying the stay-wire to a point just above the horizontal plane of the strand-wires 8. As the spindle descends it is caused to rotate by the rack-and-gear mechanism before described until when the spindle is at its lowest point the stay is approximately at a right angle to the line of feed of the machine and spans two of the adjacent strand-wires in position to be secured thereon, as shown in Fig. 27. In order that this may be accomplished, the line of feed of the wire 88 is practically midway the line of feed of the two adjacent strand-wires on which the stays formed therefrom are to be seated. When the stay is severed from the wire 88 and grasped by the jaws 151 and 155, the ends of such stay are equidistant from the center of the spindle 144, so that when such spindle is lowered and delivers the stay to the strand-wires the ends of such stay project an equal distance beyond such strand-wires, the projection of such ends being sufficient to permit an ample coiling therefrom upon the strand-wires.

In a wire fence of the class named it is usually deemed preferable to place the strand-wires closer together at the lower side of the fence, increasing the intervals between the wires gradually toward the top. To permit a fence of such construction being made by my machine, the groups of mechanism which operate the strand-wires 8 are located in the machine so as to give the desired spacing to such wires. (See Fig. 1.) This necessitates a similar arrangement of the several groups of mechanism which operate upon the wires 88, and the stay-wires must accordingly be of varying lengths. The length of the stay-wire is gaged by the distance which the wire 88 is moved into the machine at each stroke of the carrier 98 on the bar 94. (See Figs. 7 and 8.) If it is desired to increase the length of the stay, the distance between the support 109 and the lug 112 on the rod 110 is lessened by adjusting such rod to the desired length. When the rod is thus shortened, the carrier 98 is more quickly operated by the cross-bar 113, moving the gripping device a greater distance backwardly along the wire 88 and carrying forward on the return stroke a correspondingly-greater length of the wire. In increasing the length of the stay it is also necessary to adjust the cutting mechanism on the bar 94, so that the cutting-point and forward end of the wire will be equidistant from the center of the spindle 144.

The lengthening of the stays necessitates a better support thereof while being seated on the strand-wires, and to provide for this the ends of the jaws 151 and 155 are correspondingly increased, as is illustrated in Fig. 12. In this figure the spindles are raised, and the jaws 155 should not properly be shown at right angles to the line of feed of the wires, but are so shown for the purpose of showing the varying lengths thereof. When one series of stay-wires is in position to be secured to the strand-wires, such stay-wires are in approximate alinement across the machine, the adjoining ends thereof lapping, so that when coiled they form the style of fence shown in Fig. 39.

Before setting forth more completely the operation of the machine there will be described those parts by which movement is imparted to the various mechanisms hereinbefore treated of.

The main power mechanism, as shown in Figs. 2, 3, and 4, consists of a rotary driving-shaft 173 in bearings 174, to which the power is applied by any usual means. On the left side of the machine there is fixed on the shaft 173 a gear-pinion 175, engaging and actuating a gear-wheel 176 on a rotary shaft 177, journaled in hangers 178 on the plates 1 and 2. Meshing with the gear-wheel 176 and actuated thereby is a similar gear-wheel 179 on the end of a rotary shaft 180, journaled in hangers 181 in the plates 1 and 2. On the opposite end of the shaft 180 is a large cam-wheel 182, having on its periphery a small sector-gear 183 and a larger sector-gear 184. Engaged by the wheel 182 is a small wheel 185, secured on the end of the shaft 35. (See Fig. 5.) On its periphery the wheel 185 has a small sector-gear 186, a larger sector-gear 187, and two plain surfaces or shoes 188 and 189. When the operation of twisting the ends of the stay-wires upon the strand-wires is completed, all of the coiling-pins have passed to a point a quarter of a revolution beyond the highest point attained by them, as hereinafter explained, and after the stay-wires have been moved forward it is necessary to bring such coiling-pins again to the highest point before the next series of stay-wires is received by the strand-wires. This is accomplished by means of the gear 183 on the wheel 182 engaging the gear 186 on the wheel 185, rotating such wheel sufficiently to bring the coiling-pins to a point above the strand-wires, as shown in Fig. 27. The stay-wires are then delivered and the coiling accomplished by the gear 184 engaging the gear 187. An arm 190 is secured to the face of the wheel 182 by means of a pin 191 and to the lever 116 by a pin 192. The lever 116 on the other side of the machine is similarly connected with the wheel 179. By this means the cross-bar 113 is given an alternating forward and backward movement at each revolution of the shaft 180. In the outer face of the wheel 182 is a cam-track 193, engaged by a follower 194 on a lever 195, fulcrumed in the plate 1, as at c. By means of a bar 196 the free end of the lever 195 is connected with the end of an arm 197, rigidly secured on the end of the rock-shaft 147. By means of the mechanism just described the rocking of the shaft 147 is accomplished. The rocking of the shaft 165 is accomplished by the following means: On the end of the shaft 177 on the right-hand side of the machine is a cam-wheel 198, having a cam-track 199 in its outer face. Engaging the track 199 is a follower 200 on a lever 201, fulcrumed on the shaft 173. By means of a bar 202 the free end of the lever 201 is connected with the end of an arm 203, fixed on the end of the shaft 165.

Referring to the feed mechanism for drawing the strand-wires through the machine, an intermittent rotary movement is imparted to the shaft 74 in the following manner: The gear-wheel 176 is provided with an enlarged spoke 204, to which is secured a rack-bar 205 by means of a pin 206, secured in one of a series of holes 207 in said spoke, Fig. 3. The other end of the rack-bar is supported by a swinging hanger 208, suspended from the shaft 74. On the upper face of the rack-bar 205 is a rack 209, engaging a pinion 210, adapted to rotate independently upon the shaft 74 and provided on its outer face with an annular series of ratchets 211, Figs. 35 and 36, engaged by a corresponding series of opposing ratchets 212 on the inner face of a disk 213, feathered on the shaft 74, so as to have movement longitudinally thereof. At the end of the shaft 74 is fixed a collar 214, between which and the disk 213 is interposed an extensile coiled spring 215, by means of which contact of the disk 213 and wheel 210 is maintained. By this means each rotation of the shaft 177 results in the desired partial rotation of the shaft 74.

The rock-shaft 27, by means of which the spindles 14 are given longitudinal movement, is operated by means of a lever 216, secured to such shaft, Fig. 8. The free end of the lever 216 is provided with a roller 217, which engages the periphery of a cam-wheel 218 on the shaft 180. Each rotation of the wheel 218 raises the lever 216 sufficiently to move the spindles 14 forward the desired distance, such spindles being returned to their first position by means of an arm 219, fixed on the rock-shaft 27 and provided at its lower end with a contractile coiled spring 220, (rear end only shown,) secured to the front plate 4.

The carriers 42 are given a reciprocating longitudinal movement on the support 44 by the following-described means: The support 44 is provided with a bearing 221, Fig. 37, to which is secured a bell-crank lever 222, having a slotted end 223, to which is secured a roller 224, engaging a cam-track in the wheel 225, fixed on the shaft 180. Connecting the elbow of the lever 222 with the carrier 42 is a link 226. The conformation of the track in the cam-wheel 225 is such that the lever 222 is alternately raised and lowered at desired intervals, giving to the carrier 42 a corresponding longitudinal action. The reciprocating shaft 139 is operated by means of a lever 227, fulcrumed on the face of the cross-beam 97, Fig. 22. Secured on the shaft 139 is a hanger 228, having in its lower face a recess 229, engaged by the upper end of the lever 227. The lower end of such lever is actuated by a cam-track 230 in the wheel 31, fixed on the shaft 180. The lower end of the lever is thereby given a lateral reciprocating movement, which is imparted through the upper or short arm to the hanger 228 and shaft 139. The rack-bar 170 is similarly operated by a lever 232, fulcrumed on the rear face of the cross-beam 97, the lower end of such lever being actuated by the cam-track 233 in a cam-wheel 234, also fixed on the shaft 180. By the rotation of the wheel 234 a lateral reciprocating movement is imparted to the lower end of the lever and from it to the rack-bar 170 by reason of the upper end of the lever 232 engaging a recessed plate 235, secured to such bar. The channel 48 in the spindle 37 and gear-wheel 47 is at all times at the uppermost point and in register with the slot 49 in the bearing 38, except when the ends of the stay-wires are being coiled upon the strand-wires. To prevent such parts getting out of register at other times, the following mechanism is provided: On the shaft 55, through which the spindles 37 are actuated, is fixed a cam 236, Fig. 26. Secured on the shaft 40 is a bearing 237, having in its lower side a sleeve 238, in which a catch 239 has longitudinal play. The rear end of the catch 239 is secured to a lever 240, fulcrumed at its upper end to an extension of the bearing 237. A contractile coiled spring 241 is secured at one end to the lever 240 and at the other end to a lug 242 on the bearing 237. The lower end of the lever 240 is provided with a roller 243, engaging the periphery of a cam-wheel 244, fixed on the shaft 177. By the rotation of the cam-wheel 244 the lever 240 is thrown backward, drawing with it the catch 239 and releasing the cam 236. This operation is so timed that the cam 236 is released an instant before the rotation of the shaft 55. Immediately after its release, by reason of the engagement of the sector-gear 186 by the sector-gear 183, the shafts 35 and 55 are rotated sufficiently to bring the coiling-pins on the spindles 14 and 37 above the strand-wires 8. The rotation then ceases for an instant during the engagement of the periphery of the wheel 182 by the shoe 188 on the wheel 185. During this period the stay-wires are conveyed to the strand-wires in position to be coiled thereon. By the engagement of the sector-gears 184 and 187 the movement of the shafts 35 and 55 is continued until one revolution thereof is completed. One rotation of the shafts 35 and 55 imparts to the spindles 14 and 37 the desired number of revolutions required of them. When the rotation of the shaft 55 is completed, the cam 236 is again engaged by the catch 239, locking the shaft 55 in its usual position, with the channel 48 and slot 49 in register. The shafts 35 and 55 are at rest during the remainder of the revolution of the wheel 182 and while the periphery of such wheel is engaged by the shoe 189. The lower bar 65 of the crimping mechanism is raised and lowered by means of a friction-roller 245 on the end of the support 69, actuated by a cam-wheel 246, fixed on the shaft 177, Figs 32 and 34. The drum 84 is rotated by means of the following mechanism, Figs. 2 and 4: On one end of the shaft 85 is a gear-wheel 247, actuated by a gear-wheel 248 on a rotary shaft 249, journaled in bearings 250 on the bracket 87 and the bracket 251, secured to one of the legs 5. Rotating loosely on the shaft 249 is a sprocket-wheel 252, connected by means of a sprocket-chain 253 with a sprocket-wheel 254, fixed on the end of the shaft 74. Embracing the wheel 252 are two friction-disks 255 and 256, the disk 255 being loose on the shaft 249 and the disk 256 fixed thereon. By means of a hand-wheel 257, having an interiorly-threaded hub engaging corresponding threads on the shaft 249, the disk 255 can be forced against the wheel 252 until such wheel is embraced between the friction-disks tightly enough to cause the rotation of the shaft 249 and, by means of the intermediate mechanism, the roller 84. (This mechanism is not new and nothing is claimed broadly thereon.) The pressure of the friction-disks is sufficient to cause the winding of the fence upon the drum, any tendency of the drum 84 being moved faster than the fence is ready to be wound thereon being avoided by the slipping of the wheel 252 between the friction-disks when more than the usual strain is encountered.

In Figs. 40 to 42 is represented a supplemental device by means of which the gripping mechanism which feeds the wires 88 into the machine may be rendered inoperative during each alternate movement of the feed-bar 113. By this means each alternate series of the stay-wires may be omitted, or the mechanism can be so adjusted that any one or more of the stay-wires of a series may be secured on the strand-wires at each alternate operation of the feed mechanism. The purpose of this is to provide an interval between the stay-wires of double the usual length or to alternately secure adjacent pairs of strand-wires together, so as to form what is known as a "staggered" fence. The mechanism is as follows: On the shaft 180 is fixed a gear-wheel 258, engaging a gear-wheel 259, secured on a rotary shaft 260. The shaft 260 is journaled in hangers 261 in the side plates 1 and 2, Figs. 3 and 4. On the shaft 260 is fixed a cam 262, engaged by a roller 263 on an arm 264, pivoted to the end plate 3, as at d. By means of a bar 265 the free end of the arm 264 is connected with one end of an arm 266. The other end of the arm 266 is secured to a rock-shaft 267, supported in two or more bearings 268 on the cross-bar 113. Fixed on the shaft 267 is a plurality of fingers 269, one of such fingers being provided for each of the racks 104. The arrangement of the fingers 269 is such that when the arm 266 is raised to its highest point by the cam 262 the ends of such fingers are brought in contact with the rear ends of the racks 104, such contact continuing during the forward movement of the bar 113, as shown in Fig. 41. In this movement the bar 113 engages the front end of the racks 104, and the carriers 98 are thereby moved forward without the gripping-pins 102 engaging the wires 88, and the feeding of such wires is omitted. When the arm 266 is lowered, the fingers 269 are moved backwardly, so that the rack 104 does not come in contact therewith, as will be seen in Fig. 42.

It is apparent that the arm 266 is alternately raised and lowered at each rotation of the gear-wheel 259 on account of such wheel and the cam 262 both being fixed on the shaft 260, and the comparative size of the wheels 258 and 259 is such that the wheel 259 has one rotation to two of the wheel 258. During one rotation of the shaft 180 the arm 266 will therefore be raised, and during the next succeeding revolution of such shaft said arm will be lowered, and as each revolution of the shaft 180 by means of the wheel 182 and appurtenant mechanism gives to the bar 113 a forward and backward movement it is apparent that the fingers 269 will be in contact with the racks 104 during each alternate forward stroke of the bar 113.

The fingers 269 may be independently adjusted upon the shaft 267, so that any one or more of the feed devices may be affected thereby, as above shown.

To recapitulate, the operation of the machine is as follows: The strand-wires are drawn forward by the reels 78 and 80, the intermittent rotation of the shafts 74 and 76 communicating to such wires a corresponding intermittent movement through the machine. The length of such movement may be varied by increasing or decreasing the length of stroke of the rack-bar 205 by changing the position of the pin 206 in the spoke 204, as may be required. The length of feed of the strand-wires determines the length of the spaces or intervals between the succeeding series of stay-wires. The wires 88 are moved forward coincidently with the feeding of the strand-wires by means of the carriers 98 and attendant mechanism. The stay-wires are then severed by the cutting mechanism and conveyed to the strand-wires by the spindles 144. At this time the wires 8 are stationary, and the coiling-pins 19 and 46 are directly above such wires. In order that such pins may not interfere with the placing of the stay-wires across the strand-wires while in the above position, each pair of spindles 14 and 37 is separated by moving longitudinally away from each other through the operation of the several mechanisms hereinbefore described. After the stay-wires are in position to be twisted the spindles are moved toward each other again until the ends of the stay-wires are between the coiling-pins and the strand-wires ready to be coiled thereon. At this point in the operation the ends of the stay-wires alternately overlap, as shown in one of the partial series of such wires in Fig. 39 of the drawings. Two adjoining ends are then coiled in opposite directions upon the strand-wire, as shown in said Fig. 39, the spindles 14 and 37 necessarily turning in opposite directions to accomplish such coiling. As the coiling progresses the spindles are gradually drawn apart again, remaining separated until the next series of stay-wires is ready to be twisted. On account of the stay-wires being delivered upon the top or upper side of the strand-wires it is evident that the first movement of the coiling-pin upon the end of the stay must be such as to bend such end downward, and it is on that account that the coiling-pin must be in position above the strand-wire before the coiling commences. While the coiling is progressing, the stays are still held by the spindles 144; but as soon as the operation is completed the plungers 157 are raised by the arms 167 acting upon the collars 160. This disengages the levers 153 and permits the jaws 155 to open, releasing the stays. The spindles 144 are then simultaneously raised to their highest position by the arms 149. When they are in this position and ready to receive another series of stay-wires, the plungers 157 are forced downward by the arms 167 sufficiently to nearly close the jaws 155 against the jaws 151. After the wires have been fed forward and are ready to be cut the plungers 157 are moved downward still farther, forcing the upper ends of the levers 153 outwardly until the stay-wires are firmly gripped by the several pairs of jaws. The cutting and delivering operations are then repeated. After the stay-wires have been secured upon the strand-wires the supports 44 and mechanism sustained thereon are lowered, as before mentioned, disengaging the strand-wires and permitting the forward movement of the fence. After such movement the supports 44 are returned to their former positions and the strand-wires again engaged by the spindles 37. The wires are then crimped by the elevation of the bar 65, as already explained, such crimping device being so situated that one of the series of stay-wires will be in position to be crimped thereby when the strand-wires are at the end of a forward movement. After passing through the reels the fence is wound upon the drum 84, as already specified.

The operation of the mechanism for alternating the feed of the stay-wires has already been sufficiently set forth to render unnecessary any further explanation thereof.

What I claim as my invention, and desire to secure by Letters Patent of the United States, is—

1. In a wire-fence machine, the combination of mechanism for intermittently feeding a series of strand-wires through the machine; mechanism for intermittently feeding a plurality of wires into the machine above such first-named wires, and in a plane substantially parallel with the plane thereof, to be formed into stay-wires; mechanism for cutting said last-named wires into stay-wires; mechanism for simultaneously seizing a series of such stay-wires and conveying them vertically downward to the strand-wires, in position to be secured thereon; and means for coiling the ends of the stay-wires upon such strand-wires, substantially as set forth.

2. In a wire-fence machine, the combination of mechanism for intermittently feeding a series of strand-wires through the machine; mechanism for intermittently feeding a plurality of wires into the machine, above such first-named wires, and in a plane substantially parallel with the plane thereof, to be formed into stay-wires; mechanism for cutting said last-named wires into stay-wires; mechanism for simultaneously seizing a series of such stay-wires and conveying them vertically downward to the strand-wires, in position to be secured thereon; mechanism for coiling the ends of the stay-wires upon such strand-wires; and mechanism for crimping the strand-wires at the points of coiling of the stay-wires thereon, substantially as shown.

3. In a wire-fence machine, the combination of mechanism for intermittently feeding a series of strand-wires through the machine; mechanism for intermittently feeding a plurality of wires into the machine above such first-named wires, and in a plane substantially parallel with the plane thereof, to be formed into stay-wires; mechanism for cutting said last-named wires into stay-wires; mechanism for simultaneously seizing a series of such stay-wires and conveying them vertically downward to the strand-wires, in position to be secured thereon; mechanism for coiling the ends of the stay-wires upon such strand-wires; and mechanism for forming the completed fabric into compact rolls, substantially as described.

4. In a wire-fence machine, the combination of mechanism for intermittently feeding a series of wires into the machine, to be formed into stay-wires; mechanism for preventing a backward movement of such wires; mechanism for cutting such wires into suitable lengths for stay-wires; and mechanism for simultaneously seizing a series of such stay-wires, and conveying them vertically downward to a series of strand-wires, in position to be secured thereon, substantially as shown and set forth.

5. In a machine of the class named, a wire-feeding device, comprising a carrier, suitably mounted upon a bar, so as to reciprocate longitudinally thereof; a wire-gripping device, supported by such carrier; a cross-bar, adapted to oscillate longitudinally of said first-named bar, and engage such carrier, to give a limited forward movement thereto; a rod, adjustably secured to such carrier, and adapted to be engaged by said cross-bar in its rearward movement, to cause the rearward movement of such carrier; a rack, secured to said wire-gripping device, also engaged by said cross-bar, so as to cause the gripping of the wire upon the forward movement of such cross-bar and the release of such wire during the rearward movement thereof; and means for suitably oscillating such cross-bar; substantially as shown and described.

6. In a machine of the class named, a wire-feeding device, comprising a carrier, suitably mounted upon a bar, so as to reciprocate longitudinally thereof; a wire-gripping device, supported by such carrier; a cross-bar, adapted to oscillate longitudinally of said first-named bar and engage such carrier, to give a limited forward movement thereto; a rod, adjustably secured to such carrier, and adapted to be engaged by said cross-bar in its rearward movement, to cause the rearward movement of such carrier; a rack, secured to said wire-gripping device, also engaged by said cross-bar, so as to cause the gripping of the wire upon the forward movement of such cross-bar and the release of such wire during the rearward movement thereof; means for suitably oscillating such cross-bar; and means for preventing the rearward movement of the wire upon the rearward movement of such carrier, substantially as shown.

7. In a wire-fence machine, the combination of a suitably-supported bar 94; the carrier 98 adapted to reciprocate thereon; the gripping-jaw 100, carrying a gripping-pin 102; grip-block 103; rack 104, upwardly projected on the gripping-jaw 100; rod 110, suitably secured to the carrier 98, and having a lug 112; the cross-bar 113; and means for vibrating such cross-bar longitudinally of the bar 94; substantially as set forth.

8. The combination of the suitably-mounted spindle 144; the fixed jaw 151 at the lower end thereof; the movable jaw 155, adapted to engage the jaw 151; means for suitably operating the jaw 155; means for properly lowering and raising the spindle 144; and means for imparting to such spindle a partial rotation coincidently with the lowering thereof, to bring the stay-wire in position transversely of the strand-wires; substantially as shown and set forth.

9. The combination of the suitably-mounted spindle 144, provided at its lower end with a wire-gripping device; the collar 145 on the upper end of such spindle; the suitably-supported rock-shaft 147; the arm 149, secured on said rock-shaft, and engaging the collar 145; the gearing 172 on the upper face of the spindle 144; rock-bar 170, provided with the rack 171 engaging the gearing 172; means for suitably rocking the shaft 147, to impart vertical movement to the spindle 144; and means for suitably reciprocating the rack-bar 170, to cause a partial rotation of such spindle coincidently with the vertical movement thereof, substantially as shown and described.

10. The combination of the suitably-mounted spindle 144, having the stationary grip-jaw 151 at the lower end thereof; the lever 153, fulcrumed in the spindle 144, and having at its lower end the jaw 155; the plunger 157, adapted to engage the lever 153; and means for suitably operating the plunger 157, substantially as set forth.

11. The combination of the suitably-mounted spindle 144, having the stationary grip-jaw 151 at the lower end thereof; the lever 153, fulcrumed in the spindle 144, and provided at its lower end with the jaw 155; the plunger 157, adapted to engage the lever 153; the shank 159 on the plunger 157, such shank being provided with collars 160 and 161; arm 167, engaging the shank 159; a rock-shaft 165, and means for suitably rocking the shaft 165 to impart vertical movement to the plunger 157; substantially as set forth.

12. In a wire-fence machine, mechanism for coiling the ends of the stay-wires upon the strand-wires, comprising a plurality of hollow spindles 14, provided at one end with coiling-pins 19; a plurality of slotted spindles 37, having coiling-pins 46 in the ends thereof, adjacent to the coiling-pins 19; means for simultaneously rotating all of the spindles 14 in the same direction; and means for simultaneously rotating all of the spindles 37, in a direction opposite to the rotation of the spindles 14, coincidently with the rotation of said spindles 14; substantially as described.

13. In a wire-fence machine, the combination of a plurality of spindles 14, having coiling-pins 19; means for simultaneously imparting to the spindles 14 a limited longitudinal movement; a plurality of slotted spindles 37, having coiling-pins 46 adjacent to the coiling-pins 19; means for imparting to the spindles 37 a limited longitudinal movement, coincidently with the longitudinal movement of the spindles 14, but in the opposite direction; means for simultaneously rotating all of the spindles 14 in one direction; and means for simultaneously rotating all of the spindles 37 in a direction opposite to the rotation of the spindles 14, coincidently with the rotation of such spindles 14, substantially as shown and described.

14. In a wire-fence machine, the combination of a plurality of spindles 14, having coiling-pins 19; means for simultaneously imparting to the spindles 14 a limited longitudinal movement; a plurality of slotted spindles 37, having coiling-pins 46, adjacent to the coiling-pins 19; and means for simultaneously imparting to the spindles 37 a limited longitudinal movement, coincidently with the longitudinal movement of the spindles 14, but in a contrary direction; substantially as shown.

15. In a wire-fence machine the combination of a plurality of hollow spindles 14, provided at one end with coiling-pins 19; a plurality of slotted spindles 37, having coiling-pins 46, adjacent to the coiling-pins 191; means for simultaneously rotating all of the spindles 14 in the same direction; means for simultaneously rotating all of the spindles 37, in a direction opposite to the rotation of the spindles 14, coincidently with the rotation of such spindles 14; and means for lowering the series of spindles 37 below the plane of the strand-wires in their passage through the machine; substantially as shown and set forth.

16. The combination of the suitably-journaled spindle 14; the grooved collar 20, fixed thereon; the yoke 22, engaging such collar; cross-bar 23; arm 26, actuating such crossbar; shaft 27; lever 216, secured to such shaft; and means for suitably vibrating the free end of such lever, substantially as described.

17. The combination of the supports 44; the carriers 42, adapted to reciprocate on such supports; the shaft 40, rigidly secured on such carriers; a plurality of slotted coiling-spindles 37, suitably supported on the shaft 40; and means for imparting to the carriers 42 a reciprocating movement on the supports 44; substantially as shown and described.

18. The combination of the supports 44, suitably pivoted on the shaft 17; the carriers 42, mounted on such supports; the shaft 40, fixed on such carriers; a plurality of spindles 37, suitably supported on the shaft 40, and means for communicating to the free ends of the supports 44 a limited vertical movement, substantially as set forth.

19. The combination of the suitably-mounted support 44; the carrier 42, adapted to reciprocate thereon; the lever 222, suitably fulcrumed on the support 44; link 226; and means for vibrating the free end of the lever 222, to impart longitudinal movement to the carrier 42; substantially as shown and described.

20. In a wire-fence machine, the combination of a series of hollow coiling-spindles 14; a series of slotted coiling-spindles 37; a rotary shaft 35; a rotary shaft 55, parallel therewith; means for simultaneously rotating the shafts 35 and 55; means for communicating the rotation of the shaft 35 to the spindles 14; and means for imparting a rotary movement to the spindles 37 from the shaft 55, in a direction contrary to the rotation of the spindles 14; substantially as shown.

21. In a wire-fence machine, the combination of a rotary shaft 180; wheel 182 thereon, provided with sector-gears 183 and 184; wheel 185, having sector-gears 186 and 187, actuated by the gears 183 and 184, respectively; the shaft 35, on which the wheel 185 is fixed; bevel gear-wheels 34; pinions 33, actuated thereby; shafts 31; gear-wheels 30 thereon; gear-wheels 29, actuated by the wheels 30 and spindles 14, on which the wheels 29 are fixed; substantially as described and for the purpose named.

22. In a wire-fence machine, the combination of the bar 94; carrier 98, supporting a wire-feeding device; hanger 118, fixed on the bar 94; weighted grip-pin 122; grip-block 124; and means for oscillating the carrier 98 on the bar 94; substantially as shown and set forth.

23. In a wire-fence machine, the combination of the bar 94; carrier 98, supporting a wire-feeding device; hanger 118, fixed on the bar 94, a wire-gripping device supported thereby; perforated wire-support 127, fixed on the bar 94; hanger 131; adjacent to the support 127; knife 134, seated therein; means for vibrating the hanger 131; and means for reciprocating the carrier 98, and coincidently operating the gripping device supported thereby; substantially as shown and described.

24. The combination of the support 44, hingeably secured at one end on the shaft 17, and having its free end suitably supported to permit a limited vertical movement thereof; the carrier 42, mounted on the support 44, so as to have longitudinal play thereon; the suitably-supported lever 222, flexibly secured to the carrier 42; cam 225, operating the lever 222; and means for imparting to the free end of the support 44 a limited vertical movement; substantially as set forth.

25. The combination of the cam 236, fixed on the shaft 55; the suitably-supported catch 239, engaging the cam 236; the lever 240, suitably fulcrumed at its upper end, and having the rear end of the catch 239 pivotally attached thereto; and means for actuating the lever 240 to cause the catch 239 to alternately engage and release the cam 236, substantially as described.

26. The combination of the stationary bar 61, having a series of dies 64; the vertically-movable bar 65, provided with a plurality of dies 68; supports 69, sustaining the bar 65; rotary shaft 177; and cams 246 thereon, actuating the supports 69; substantially as shown and described.

27. In a wire-fence machine, the combination of a series of reels 78, suitably mounted in such machine; such reels being provided on their peripheries with a plurality of bifurcated prongs 79, in alinement across the reels;

a similar series of reels 80, suitably mounted above the reels 78, corresponding in location with the reels 78, and similarly provided with prongs 81; and means for suitably imparting to the reels 78 and 80 an intermittent rotary movement; substantially as set forth.

28. A wire-feed mechanism, comprising a suitably-supported carrier, adapted to reciprocate longitudinally of the line of feed of the wire; a wire-gripping device, supported by such carrier; a cross-bar adapted to communicate reciprocating movement to said carrier, and also suitably actuate the wire-gripping device upon the forward movement of such carrier; a finger, adapted to engage such wire-gripping device, so as to interfere with the operation thereof by such cross-bar; and means for bringing such finger into engagement with such wire-gripping device at each alternate forward movement of said carrier; substantially as shown and described.

29. In a wire-feed mechanism, the combination of a suitably-mounted bar 94; a carrier 98, adapted to reciprocate thereon, and provided with a rearwardly-extending actuating-rod 110, the wire-gripping jaw 100, supported on the carrier 98, and provided with the grip-pin 102 and rack 104; the cross-bar 113, adapted to have a limited oscillation longitudinally of the bar 94; a rock-shaft 267, suitably mounted on such cross-bar; a finger 269, fixed on such rock-shaft; and means for suitably rocking such shaft to cause the finger 269 to engage the rack 104 at each alternate forward movement of the cross-bar 113; substantially as described and for the purpose named.

30. The combination of the rotary shaft 180; gear-wheel 258 thereon; rotary shaft 260; wheel 259 thereon, actuated by the wheel 258; cam 262 on the shaft 260; arm 264, actuated by such cam; bar 265; arm 266, connected by such bar with the arm 264; rock-shaft 267, on which is fixed the arm 266; and fingers 269, secured on such rock-shaft; substantially as shown and set forth.

In testimony whereof I affix my signature in presence of two witnesses.

PETER FRANTZ.

Witnesses:
MARY A. BARNUM,
JONATHAN FRANTZ.